(12) United States Patent
Chung

(10) Patent No.: US 9,728,958 B2
(45) Date of Patent: Aug. 8, 2017

(54) CURRENT ELECTRONIC DISTRIBUTING DEVICE

(71) Applicant: HON HAI PRECISION INDUSTRY CO., LTD., New Taipei (TW)

(72) Inventor: Her-Shuenn Chung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 423 days.

(21) Appl. No.: 14/479,059

(22) Filed: Sep. 5, 2014

(65) Prior Publication Data

US 2015/0137599 A1  May 21, 2015

(30) Foreign Application Priority Data

Nov. 20, 2013  (TW) .............. 102142262 A

(51) Int. Cl.
  *H02J 1/14*  (2006.01)
  *H02H 9/00*  (2006.01)
(52) U.S. Cl.
  CPC .............. *H02J 1/14* (2013.01); *H02H 9/008* (2013.01); *Y10T 307/406* (2015.04)
(58) Field of Classification Search
  CPC .............. H02J 1/14; H02H 9/008; H02H 9/02
  USPC ........................................................ 307/31
  See application file for complete search history.

(56) References Cited

U.S. PATENT DOCUMENTS 7,531,914 B1 * 5/2009 Moore .................. H02H 3/087
                                                  307/11
2005/0052797 A1  3/2005 Yan
2007/0064361 A1 * 3/2007 Itoshima ................ H02H 11/00
                                                  361/62
2008/0068871 A1  3/2008 Kokubun et al.
2010/0254054 A1  10/2010 Chishima
2010/0264893 A1  10/2010 Li
2012/0143534 A1  6/2012 Yang
2014/0354047 A1 * 12/2014 Markhovsky ......... H02J 7/0068
                                                  307/23

FOREIGN PATENT DOCUMENTS

| CN | 2901666 Y    | 5/2007  |
|----|--------------|---------|
| CN | 101551688    | 10/2009 |
| CN | 100583003 C  | 1/2010  |
| CN | 201781326 U  | 3/2011  |
| CN | 102103386 A  | 6/2011  |

(Continued)

*Primary Examiner* — Rexford Barnie
*Assistant Examiner* — Terrence Willoughby
(74) *Attorney, Agent, or Firm* — Steven Reiss

(57) ABSTRACT

A current electronic distributing device that can limit maximum output currents of a plurality of input/output (I/O) ports to a first current or a second current. The current electronic distributing device includes a plurality of current detection units, a plurality of current limiting units, a control unit, and a power supply unit. The power supply unit supplies power to the current electronic distributing device. Each of the current detection units respectively detects consumption currents of each of the I/O ports. The control unit calculates a sum of the consumption currents of the plurality of I/O ports, and controls each of the current limiting units to limit the maximum output currents of each of the I/O ports to the first current or the second current according to the sum of the consumption currents of the plurality of I/O ports.

16 Claims, 3 Drawing Sheets

(56) References Cited

FOREIGN PATENT DOCUMENTS

| CN | 102857719 A | 1/2013 |
|---|---|---|
| TW | 200908498 A | 2/2009 |
| TW | 201104398 A | 2/2011 |
| TW | 201140322 A | 11/2011 |
| TW | 201145760 A | 12/2011 |

\* cited by examiner

CURRENT ELECTRONIC DISTRIBUTING DEVICE

FIELD

The disclosure relates to electronic devices, and particularly to an electronic device that can limit output currents of input/output (I/O) ports of the electronic device.

BACKGROUND

In current design, when an electronic device comprises a plurality of input/output (I/O) ports, a sum of maximum power consumptions of each of the I/O ports is greater than a maximum output power of the electronic device. In addition, a sum of maximum current consumptions of each of the I/O ports is greater than a maximum output current of the electronic device. It is challenging to make an electronic device that can adjust the current consumptions of each of the I/O ports.

BRIEF DESCRIPTION OF THE DRAWINGS

Implementations of the present technology will now be described, by way of example only, with reference to the attached figures.

DETAILED DESCRIPTION

Figure 1:
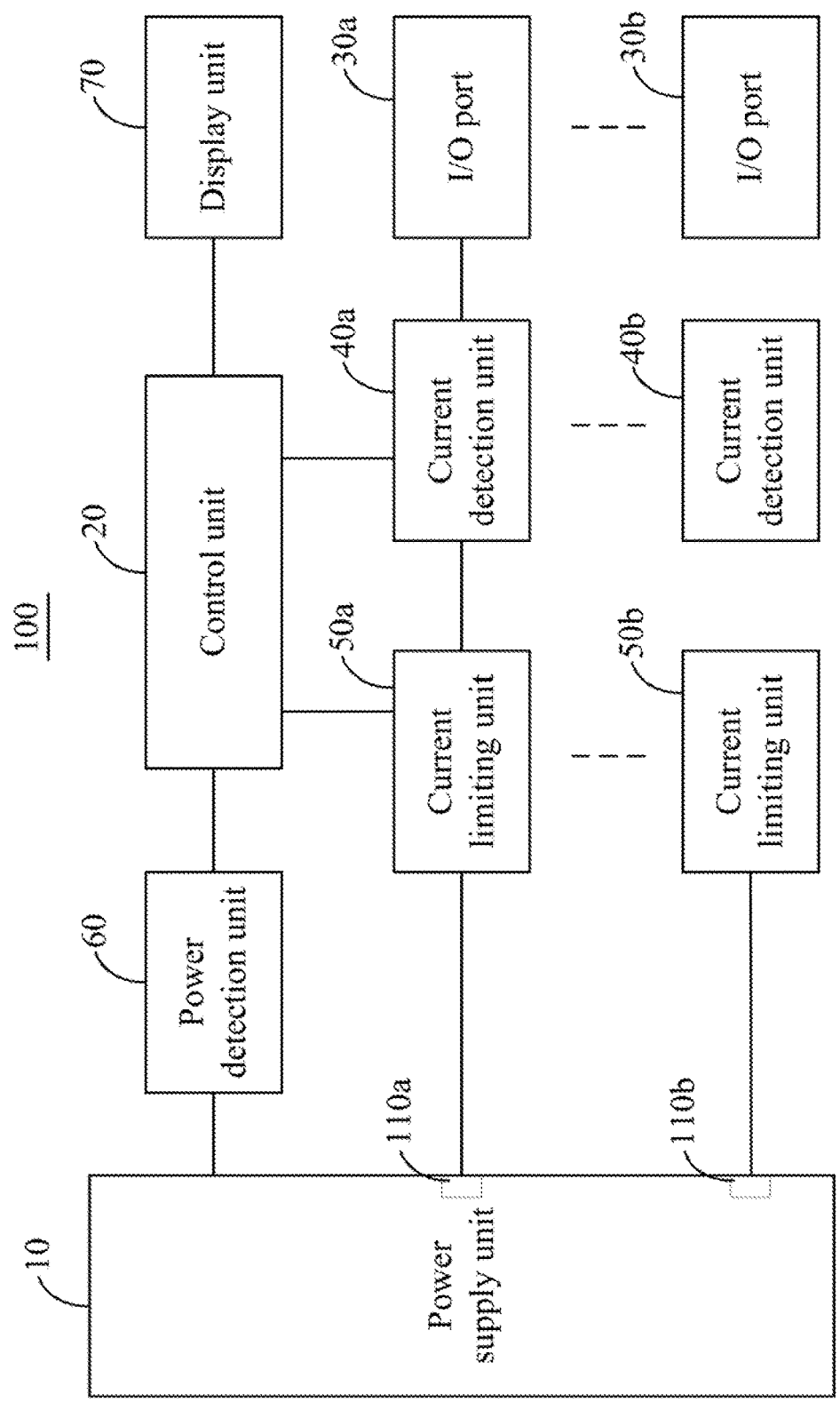
FIG. 1 is a diagrammatic view of a first embodiment of a current electronic distributing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation a current electronic distributing device.

FIG. 1 illustrates a current electronic distributing device 100. In at least one embodiment, the current electronic distributing device 100 comprises a power supply unit 10, a control unit 20, a plurality of input/output (I/O) ports 30a, 30b (two shown as a non-limiting example), a plurality of current detection units 40a, 40b (two shown as a non-limiting example), and a plurality of current limiting units 50a, 50b (two shown as a non-limiting example). The power supply unit 10 supplies power to the current electronic distributing device 100. Each of the current detection units 40a, 40b is coupled to each of the I/O ports 30a, 30b, respectively, and correspondingly detects consumption currents of each of the I/O ports 30a, 30b.

Each of the current limiting units 50a, 50b is coupled between each of the power supply ports 110a, 110b and each of the current detection units 40a, 40b, respectively. Each of the current limiting units 50a, 50b correspondingly limits maximum output currents of each of the I/O ports 30a, 30b.

In at least one embodiment, the power supply unit 10 comprises a plurality of power supply ports 110a, 110b (two shown as a non-limiting example), and each of the power supply ports 110a, 110b respectively supplies power to each of the I/O ports 30a, 30b.

In at least one embodiment, the current limiting unit 50a limits the maximum output current of the I/O port 30a to 500 mA, and the current limiting unit 50b limits the maximum output current of the I/O port 30b to 500 mA. In other embodiments, the current limiting unit 50a limits the maximum output current of the I/O port 30a to 300 mA, and the current limiting unit 50b limits the maximum output current of the I/O port 30b to 300 mA.

In at least one embodiment, the maximum output current of the I/O port 30a can also be different from the maximum output current of the I/O port 30b. The current limiting unit 50a limits the maximum output current of the I/O port 30a to 500 mA, and the current limiting unit 50b limits the maximum output current of the I/O port 30b to 300 mA.

The control unit 20 is coupled to the current detection units 40a, 40b, the current limiting units 50a, 50b, and the power supply unit 10. The control unit 20 obtains the consumption currents of the I/O ports 30a, 30b via the current detection units 40a, 40b and calculates a sum of the consumption currents of the I/O ports 30a, 30b. When the sum of the consumption currents of the I/O ports 30a, 30b is greater than a first predetermined value, the control unit 20 outputs a first current limiting signal to the one or more current limiting units, limiting the maximum output currents of the I/O ports 30a, 30b which are coupled to the one or more current limiting units at the first current.

In at least one embodiment, a number of the one or more current limiting units is determined by differences between the sum of the consumption currents of the I/O ports 30a, 30b and the first predetermined value.

When the sum of the consumption currents of the I/O ports 30a, 30b is less than the first predetermined value, the control unit 20 outputs a second current limiting signal to each of the current limiting units 50a, 50b, to limit the maximum output currents of each of the I/O ports 30a, 30b at the second current.

In at least one embodiment, a value of the second current is greater than a value of the first current. The first predetermined value is determined by a maximum supply current of the power supply unit 10, and the first predetermined value is less than a value of the maximum supply current of the power supply unit 10. When the value of the maximum supply current is 5 amps (A), the first predetermined value can be 4.5 A.

In at least one embodiment, the current electronic distributing device 100 further comprises a power detection unit 60 and a display unit 70. The power detection unit 60 is coupled between the power supply unit 10 and the control unit 20. The power detection unit 60 detects a type of the power supply unit 10 to obtain the maximum supply current of the power supply unit 10, and outputs the second current limiting signal to each of the current limiting units 50a, 50b in response to the maximum supply current of the power supply unit 10 being greater than a second predetermined value. Each of the current limiting units 50a, 50b correspondingly limits the maximum output currents of each of the I/O ports 30a, 30b at the second current.

In at least one embodiment, the second predetermined value is no less than a product of the second current and a number of the I/O ports 30a, 30b.

The display unit 70 is coupled to the control unit 20. The display unit 70 displays the consumption currents of each of the I/O ports 30a, 30b, and a user can further make unused I/O ports suspend work according to the displayed consumption currents of the I/O ports 30a, 30b.

Figure 2:
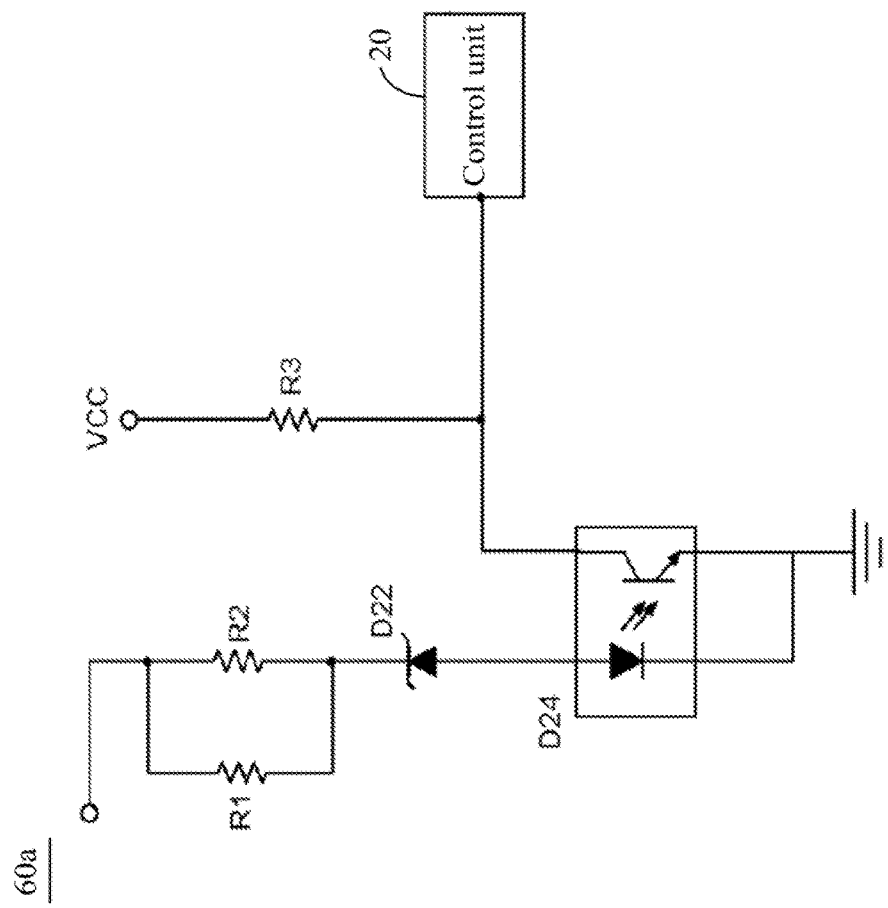
FIG. 2 is a circuit diagram of a first embodiment of a power detection unit.

FIG. 2 illustrates a circuit diagram of a power detection unit 60a. In at least one embodiment, the current electronic distributing device 100 supports two types power supply units. That is, the power supply unit 10 can be a first type power supply unit or a second type power supply unit. When the power supply unit 10 is the first type power supply unit, an output voltage range of the power supply unit 10 is 43V-56V, and the maximum supply current of the power supply unit 10 is 5A. When the power supply unit 10 is the second type power supply unit, the output voltage range of the power supply unit 10 is 10V-16V, and the maximum supply current of the power supply unit 10 is 3A.

The power detection unit 60a comprises a first resistor R1, a second resistor R2, a zener diode D22, a photoelectric sensor D24, and a third resistor R3. A first end of the first resistor R1 is coupled to the power supply unit 10, and a second end of the first resistor R1 is coupled to a cathode of the zener diode D22. A first end of the second resistor R2 is coupled to a node between the first resistor R1 and the power supply unit 10, and a second end of the second resistor R2 is coupled to a node between the first resistor R1 and the zener diode D22. A photoelectric sensor D24 comprises a first input terminal, a second input terminal, a first output terminal, and a second output terminal. The first input terminal of the photoelectric sensor D24 is coupled to an anode of the zener diode D22, the second input terminal of the photoelectric sensor D24 is grounded, the first output terminal of the photoelectric sensor D24 is coupled to the control unit 20, and the second output terminal of the photoelectric sensor D24 is grounded. A first end of the third resistor R3 is coupled to a power VCC, and a second end of the third resistor R3 is coupled to a node between the photoelectric sensor D24 and the control unit 20. When the output voltage of the power supply unit 10 is greater than a reverse voltage of the zener diode D22, the photoelectric sensor D24 is turned on, and the first output terminal of the photoelectric sensor D24 outputs a first sensor signal to the control unit 20. When the output voltage of the power supply unit 10 is less than the reverse voltage of the zener diode D22, the photoelectric sensor D24 is turned off, and the first output terminal of the photoelectric sensor D24 outputs a second sensor signal to the control unit 20.

In at least one embodiment, a value of the reverse voltage of the zener diode D22 is less than a value of the output voltage of the first type power supply unit, and the value of the reverse voltage of the zener diode D22 is greater than a value of the output voltage of the second type power supply unit. The value of the reverse voltage of the zener diode D22 can be 20V.

The control unit 10 obtains the maximum supply current of the power supply unit 10 according to the first sensor signal and the second sensor signal. When the control unit receives the first sensor signal from the photoelectric sensor D24, the power supply unit 10 is the first type power supply unit, and the maximum supply current of the power supply unit 10 is 5A. When the control unit receives the second sensor signal from the photoelectric sensor D24, the power supply unit 10 is the second type power supply unit, and the maximum supply current of the power supply unit 10 is 3A.

In at least one embodiment, when the current electronic distributing device 100 only supports one type power supply unit, the power detection unit 60a is moot.

Figure 3:
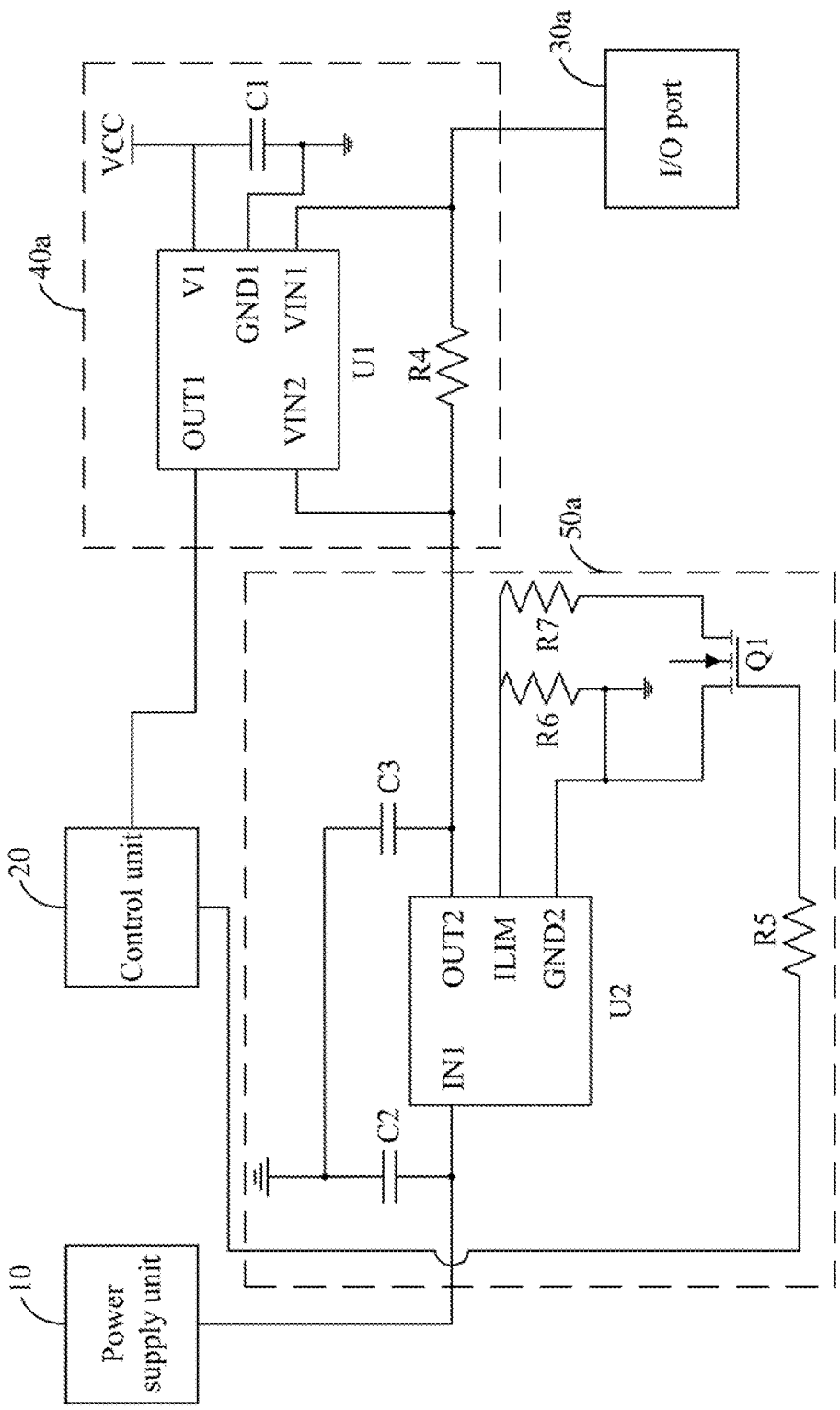
FIG. 3 is a circuit diagram of a first embodiment of a current detection unit and a current limiting unit.

FIG. 3 illustrates circuit diagrams of the current detection unit 40a and the current limiting unit 50a. In at least one embodiment, the current detection unit 40a comprises a current detection chip U1. The current detection chip U1 detects a current flowing through a fourth resistor R4 to obtain the consumption current of the I/O port 30a. The current detection chip U1 comprises a first detection pin VIN1, a second detection pin VIN2, an output pin OUT1, a power pin V1, and a ground pin GND1. The first detection pin VIN1 is coupled to a first end of the fourth resistor R4, the second detection pin VIN2 is coupled to a second end of the fourth resistor R4, the output pin OUT1 is coupled to the control unit 20, the power pin V1 is coupled to the power VCC, and the ground pin GND1 is grounded. A first end of a first capacitor C1 is coupled to a node between the power pin V1 and the power VCC, and a second end of the first capacitor C1 is grounded. The output pin OUT1 transmits the detected consumption current of the I/O port 30a to the control unit 20.

The current limiting unit 50a comprises a current limiting chip U2, a fifth resistor R5, a switch Q1, and a resistance element L1. A first end of the fifth resistor R5 is coupled to the control unit 20. The switch Q1 comprises a control terminal, a first terminal, and a second terminal. The control terminal of switch Q1 is coupled to a second end of the fifth resistor R5, the first terminal of switch Q1 is coupled to the resistance element L1, and the second terminal of switch Q1 is grounded. The resistance element L1 is coupled to the current limiting chip U2. Switch Q1 is turned on and off according to the first current limiting signal and the second current limiting signal output by the control unit 20. The current limiting chip U2 receives two different resistances from the resistance element L1 to limit the maximum output current of the I/O port 30a at the first current and the second current.

In at least one embodiment, the resistance element L1 comprises a sixth resistor R6 and a seventh resistor R7. A first end of the sixth resistor R6 is coupled to the current limiting chip U2, and a second end of the sixth resistor R6 is grounded. A first end of the seventh resistor R7 is coupled to a node between the sixth resistor R6 and the current limiting chip U2, and a second end of the seventh resistor R7 is coupled to the first terminal of switch Q1. When switch Q1 is turned off, the resistance of the resistance element L1 is equivalent to the sixth resistor R6, and the current limiting chip U2 limits the maximum output current of the I/O port 30a at the first current. When switch Q1 is turned on, the resistance of the resistance element L1 is equivalent to the sixth resistor R6 and the seventh resistor R7 in parallel, and the current limiting chip limits the maximum output current of the I/O port 30a at the second current. The current limiting chip U2 comprises an input pin IN1, a current output pin OUT2, a current limiting pin ILIM, and a ground pin GND2. The input pin IN1 is coupled to the power supply unit 10, the current output pin OUT2 is coupled to the I/O port 30a via the fourth resistor R4, the current limiting pin ILIM is coupled to a node between the sixth resistor R6 and the seventh resistor R7, and the ground pin GND2 is grounded. The input pin IN1 is further grounded via a second capacitor C2, and the current limiting pin ILIM is further grounded via a third capacitor C3.

In at least one embodiment, the first sensor signal and the first current limiting signal comprise a low level signal (logic 0), and the second sensor signal and the second limiting signal comprise a high level signal (logic 1). Switch Q1 can be an N type metal-oxide semiconductor field effect transistor (NMOSFET), a P type metal-oxide semiconductor field effect transistor (PMOSFET), a npn type transistor, and a pnp type transistor.

In at least one embodiment, the control unit 10 further controls the current electronic distributing device 100 decreasing power consumption in response to the consumption currents of the I/O ports 30a, 30b being greater than the first predetermined value. For example, the current electronic distributing device 100 decreases a backlight of the display unit 70 or a frequency of the central processing unit (not shown) comprising the current electronic distributing device 100.

Many details are often found in the art such as the other features of a shielding plate. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A current electronic distributing device comprising:
   a plurality of input/output (I/O) ports;
   a plurality of current detection units, each of the current detection units respectively coupled to each of the I/O ports, and each of the current detection units configured to detect consumption currents of each of the I/O ports, respectively;
   a plurality of current limiting units, each of the current limiting units respectively coupled to each of the current detection units, and each of the current limiting units configured to limit maximum output currents of each of the I/O ports, respectively;
   a control unit coupled to the plurality of current detection units and the plurality of current limiting units, the control unit configured to control each of the current limiting units to limit the maximum output currents of each of the I/O ports to a first output current or a second output current according to a sum of the consumption currents of the plurality of I/O ports; and
   a power supply unit coupled to the plurality of current limiting units and coupled to the control unit, thereby enabling the power supply unit to supply power to the control unit and the plurality of I/O ports;
   wherein a value of the second current is greater than a value of a first current.

2. The current electronic distributing device of claim 1, wherein, in response to the sum of the consumption currents of the plurality of I/O ports being greater than a predetermined value, the control unit outputs a current limiting signal to one or more current limiting units and the one or more current limiting units limit the maximum output currents of the I/O ports which are coupled to the one or more current limiting units at the first current.

3. The current electronic distributing device of claim 1, wherein, in response to the sum of the consumption currents of the plurality of I/O ports being less than a predetermined value, the control unit outputs a current limiting signal to each of the current limiting units each of the current limiting units correspondingly limits the maximum output currents of each of the I/O ports at the second current.

4. The current electronic distributing device of claim 1, further comprising a power detection unit coupled between the power supply unit and the control unit, wherein the power detection unit detects a type of the power supply unit to obtain a maximum supply current of the power supply unit, and wherein, in response to the maximum supply current of the power supply unit being greater than a predetermined value, the control unit outputs a current limiting signal to each of the current limiting units and each of the current limiting units correspondingly limits the maximum output currents of each of the I/O ports at the second current.

5. The current electronic distributing device of claim 4, wherein the predetermined value is no less than a product of the second current and a number of the I/O ports.

6. The current electronic distributing device of claim 4, wherein the power detection unit comprises:
   a first resistor with a first end coupled to the power supply unit;
   a zener diode with a cathode coupled to a second end of the first resistor;
   a second resistor with a first end coupled to a node between the first resistor and the power supply unit and a second end coupled to a node between the first resistor and the zener diode;
   a photoelectric sensor comprising a first input terminal coupled to an anode of the zener diode, a second input terminal grounded, a first output terminal coupled to the control unit, and a second output terminal grounded; and
   a third resistor with a first end coupled to a power and a second end coupled to a node between the photoelectric sensor and the control unit;
   wherein the photoelectric sensor outputs a first sensor signal in response to the photoelectric sensor turning on and outputs a second sensor signal in response to the photoelectric sensor turning off, and the control unit obtains the maximum supply current of the power supply unit according to the first sensor signal and the second sensor signal.

7. The current electronic distributing device of claim 6, wherein a reverse voltage of the zener diode is determined by output voltages of the power supply unit.

8. The current electronic distributing device of claim 6, wherein the first sensor signal is a low level signal, and the second sensor signal is a high level signal.

9. The current electronic distributing device of claim 1, wherein each of the current limiting units comprises:
   a current limiting chip;
   a first resistor with a first end coupled to the control unit;
   a switch comprising a control terminal coupled to a second end of the first resistor, a first terminal, and a second terminal grounded; and
   a resistance element coupled between the current limiting chip and the first terminal of the switch;

wherein the current limiting chip receives two different resistances from the resistance element to limit the maximum output current of the I/O port which is coupled to the current limiting chip at the first current and the second current, and the two different resistances output by the resistance element correspond to the switch turning on and off, respectively.

10. The current electronic distributing device claim 9, wherein the resistance element comprises:
   a second resistor with a first end coupled to the current limiting chip and a second end grounded ; and
   a third resistor with a first end coupled to a node between the second resistor and the current limiting chip and a second end coupled to the first terminal of the switch.

11. The current electronic distributing device of claim 10, wherein the current limiting chip limits the maximum output current of the I/O port which is coupled to the current limiting chip at the first current via the second resistor in response to the switch turning off, and the current limiting chip limits the maximum output current of the I/O port which is coupled to the current limiting chip at the second current via the second resistor and the third resistor in parallel in response to the switch turning on.

12. The current electronic distributing device of claim 9, wherein the current limiting chip comprises:
   an input pin coupled to the power supply unit;
   a current output pin coupled to the corresponding I/O port via a second resistor; and
   a current limiting pin coupled to the resistance element.

13. The current electronic distributing device of claim 12, wherein each of the current detection units comprises a current detection chip, the current detection chip detects a current flowing through the second resistor to obtain a consumption current of the I/O port which is coupled to the current detection chip.

14. The current electronic distributing device of claim 13, wherein the current detection chip comprises:
   a first detection pin coupled to a first end of the second resistor;
   a second detection pin coupled to a second end of the second resistor; and
   an output pin coupled to the control unit, the output pin transmitting the consumption current of the I/O port which is coupled to the current detection chip to the control unit.

15. The current electronic distributing device of claim 1, further comprising a display unit coupled to the control unit, wherein the display unit displays the consumption currents of each of the I/O ports.

16. The current electronic distributing device of claim 1, wherein each of the current limiting units comprises:
   a current limiting chip;
   a first resistor with a first end coupled to the control unit;
   a switch comprising a control terminal coupled to a second end of the first resistor, a first terminal, and a second terminal grounded; and
   a resistance element coupled between the current limiting chip and the first terminal of the switch.

* * * * *